United States Patent
Stephenson et al.

(10) Patent No.: US 6,845,603 B1
(45) Date of Patent: Jan. 25, 2005

(54) SIDE-PULL MOWER-CONDITIONER TONGUE OPERATIVELY ASSOCIATED WITH ACCESS DOOR FOR CLOSING DOOR WHEN TONGUE IS SWUNG

(75) Inventors: Roger Dale Stephenson, Ottumwa, IA (US); Darwin Daniel Fish, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/805,858

(22) Filed: Mar. 22, 2004

(51) Int. Cl.[7] .............................................. A01D 34/82
(52) U.S. Cl. ...................................................... 56/218
(58) Field of Search .......................... 56/6, 14.9, 14.7, 56/15.1–15.7, 192, 218, 228, DIG. 14; 280/475, 763.1

(56) References Cited

U.S. PATENT DOCUMENTS 3,881,303 A * 5/1975 Krafka et al. .................. 56/192
4,787,196 A * 11/1988 Voler et al. .................... 56/13.6
6,082,085 A * 7/2000 Stelzer et al. ................. 56/14.9
6,122,902 A * 9/2000 Loehr ........................... 56/15.2
6,718,747 B2 * 4/2004 Friesen ......................... 56/218

* cited by examiner

*Primary Examiner*—Robert E Pezzuto

(57) ABSTRACT

The cutter bar of a side-pull mower-conditioner is located within a housing including a forward top wall section defined by an access door that is hinged for being lifted from a substantially horizontal position to a raised position permitting access to the cutter bar. A towing tongue mounted at the side of the carrier frame of the mower-conditioner is mounted for swinging horizontally about a vertical axis and is operatively associated with the access door so that the open access door is closed when the tongue is swung toward the open door. In one embodiment, the association is a specially shaped door support member fixed to the tongue. In a second embodiment, the association is established by a linkage, and in a third embodiment, the association is through a hydraulic circuit, including a door cylinder coupled for moving the door between its open and closed position, coupled to the hydraulic tongue swing cylinder such that when the tongue swung cylinder is actuated for swinging the tongue toward the open access door, the access door is closed by the door cylinder prior to the operation of the tongue swing cylinder.

6 Claims, 5 Drawing Sheets

SIDE-PULL MOWER-CONDITIONER TONGUE OPERATIVELY ASSOCIATED WITH ACCESS DOOR FOR CLOSING DOOR WHEN TONGUE IS SWUNG

FIELD OF THE INVENTION

The present invention relates to a side-pull mower-conditioner, and more specifically relates to a device for preventing an access door of the mower-conditioner, which has been inadvertently left open, from being damaged when the tongue swings across the zone occupied by the open door.

BACKGROUND OF THE INVENTION

The rotary cutter bar of many rotary mower conditioners are contained within a housing which includes a door comprising a rectangular panel which is disposed generally horizontally when closed, and a curtain coupled in depending relationship to a forward edge of the panel so as to extend vertically across the front of the machine. The curtain is pushed back by the standing crop, as the mower-conditioner advances, to allow the crop to be cut. The curtain provides shielding for the operator and bystanders from foreign objects which are engaged and propelled by the rotating cutting discs. The curtain and door assembly is typically hinged at the top of the housing so as permit the curtain and door assembly to be raised to allow better access for service of the cutter bar area of the machine. In some cases, this door and curtain assembly can be damaged by accidentally leaving the door open and effecting an operation which results in the tongue sweeping into the zone occupied by the open access door.

Some designs address the above-noted problem by designing the door such that by unhooking one end of the door support, the operator may pivot the door out about a vertical axis and then lay the door on the ground. This approach is used by the Vermeer Mfg. Co. on their Model 620 Mower-Conditioner and has the drawback that, once the servicing of the cutter bar is complete, the operator must pick the door up, pivot the door back into place and then fasten the door in place.

Other designs allow the tongue to pass over the door by mounting the tongue to the carrier frame at a height which results in the tongue structure being located higher than the opened door. This approach is used by Deere & Company on the JD 946 and 956 Center Pivot Mower-Conditioners. The problem with this approach is that the high location of the tongue introduces higher forces into the carrier frame which must require heavier structure to compensate for them.

SUMMARY OF THE INVENTION

According to the present invention, there is provided an improved side-pull mower-conditioner which permits the tongue to be mounted at a relatively low location on the carrier frame without having to be concerned about damaging an open access door.

An object of the invention is to provide a side-pull mower-conditioner with a tongue which swings through a path which is occupied by the access door when the door is open, and to provide an operative association between the tongue and the door such that movement of the tongue toward the open door will cause the latter to close.

This object is achieved, in accordance with a first embodiment of the invention, by providing an operative connection between the tongue and the access door defined by a door engaging structure carried by the tongue and against which the door may rest when the door is opened, with the door engaging structure being shaped such that it causes the door to be moved from the path of movement of tongue in response to contact between the door engaging structure and the tongue caused by the tongue being swung toward the door.

The object is achieved, in accordance with a second embodiment of the invention, by providing an operative connection between the tongue and access door which is defined by a linkage coupled between the tongue and the door such that the linkage will close the door when the tongue moves toward the open door.

The object is achieved, in accordance with a third embodiment of the invention by providing an operative connection between the tongue and the access door which is defined by a hydraulic circuit including a hydraulic door cylinder coupled to the access door and coupled in circuit with the tongue swing cylinder such that, when a control valve for the tongue cylinder is actuated to swing the tongue toward the open access door, the door cylinder operates to close the access door prior to the swing cylinder operating to swing the tongue.

This and other objects will become apparent with a reading of the ensuing description together with the appended drawings.

DESCRIPTION OF THE PREFERRED EMBODIMENT

Figure 1:
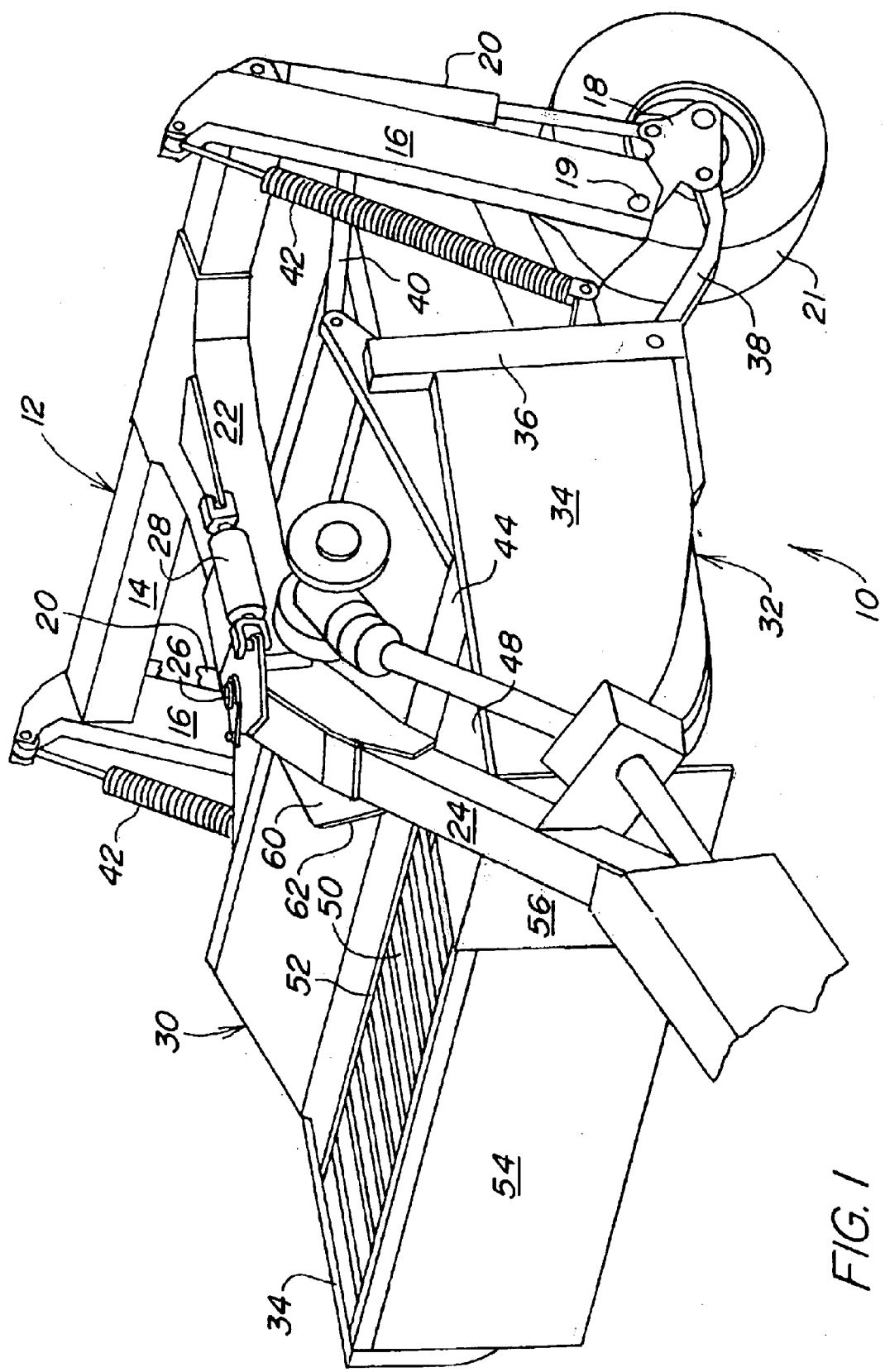
FIG. 1 is a left front perspective view of a side-pull mower-conditioner showing the tongue in an outward working position, showing the access door and associated safety curtain in a lowered working position and showing the tongue equipped with a door support structure, in accordance with a first embodiment of the invention.
Figure 2:
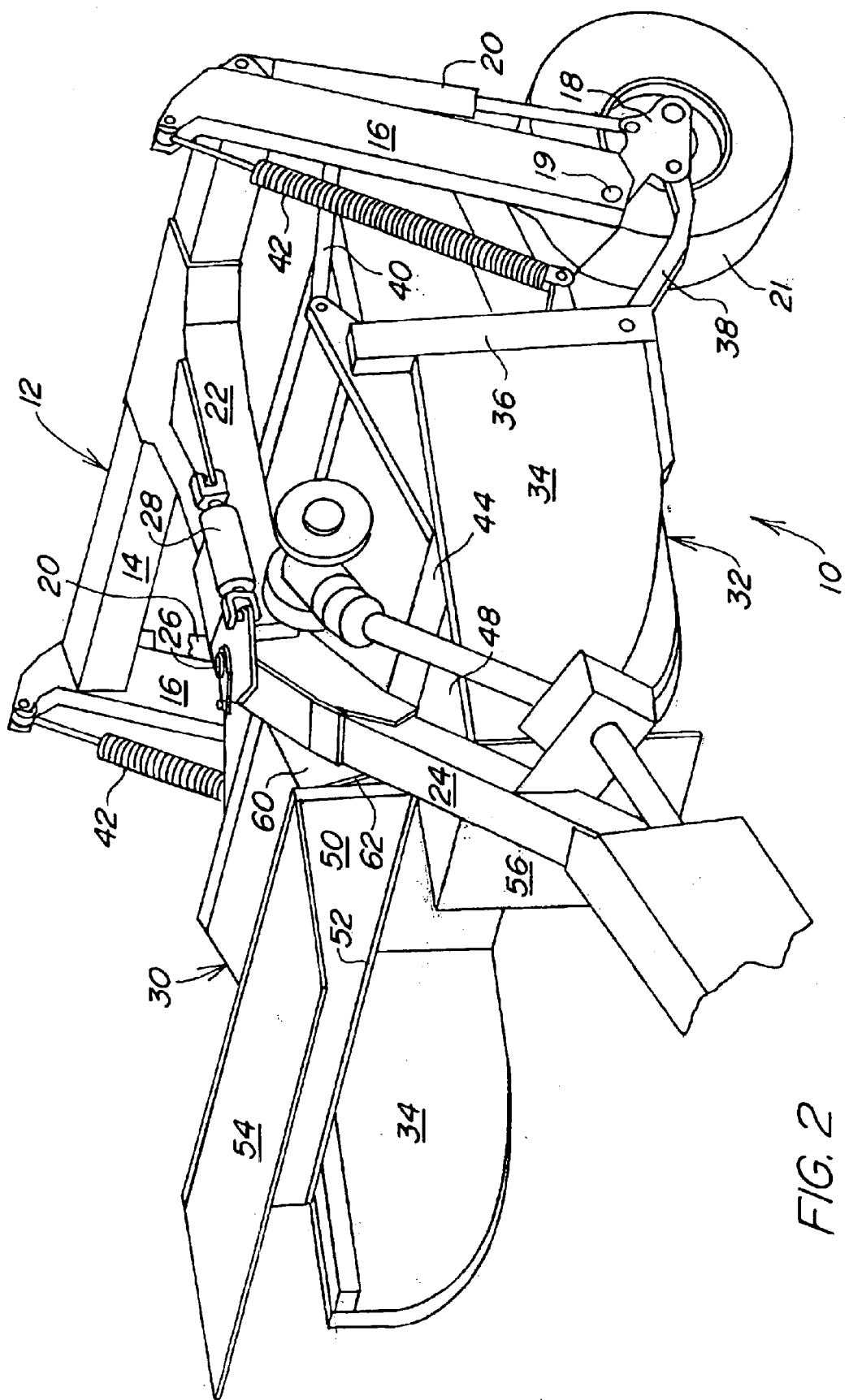
FIG. 2 is a view like FIG. 1, but showing the access door in a raised open position wherein it rests against the door support structure.
Figure 3:
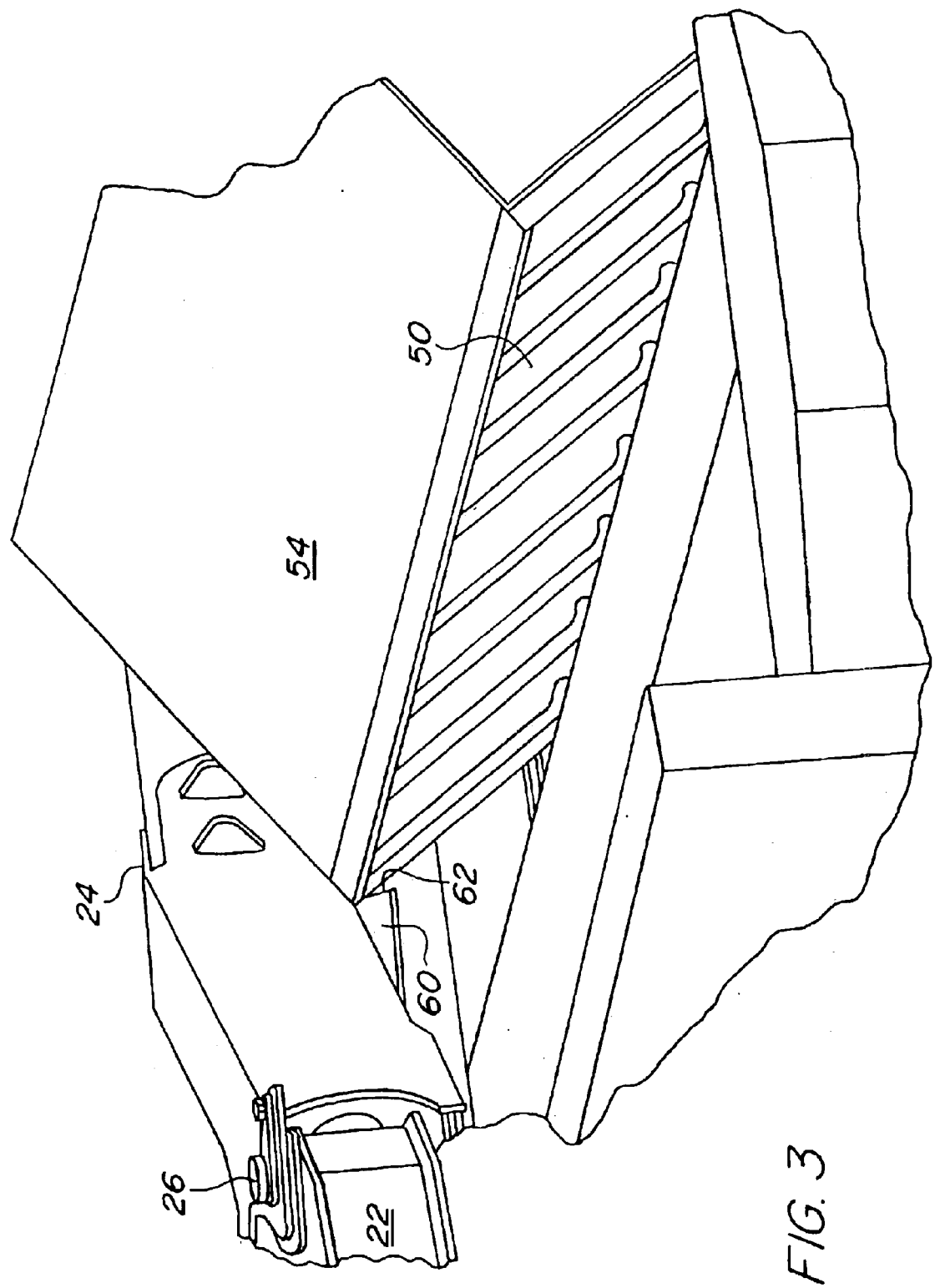
FIG. 3 is an enlarged right rear perspective view of a portion of the structure shown in FIG. 2.

Referring now to FIGS. 1–3, there is shown a side-pull mower-conditioner 10 including carrier or main frame 12 including a cross beam 14 extending transversely to a normal direction of travel and having opposite ends joined to depending wheel-support legs 16. Wheel support arms 18 are respectively pivoted to lower ends of the legs 16 by pins 19, with only the left-hand arm 18 being shown. Hydraulic wheel actuating cylinders 20 are coupled between brackets provided at upper rear locations of the legs 16 and rear ends of the wheel support arms 18. Ground wheels 21 are mounted to the rear ends of the wheel support arms 18.

The main frame 12 further includes a draft tongue support structure 22 which is joined to, and projects forwardly from, a leftward region of the cross beam 14, however, the particular location of the tongue support structure on the beam 14 is not important to the present invention. A draft tongue 24 has a rear end coupled to a forward end of the support structure 22 by a vertical pin 26 which establishes an upright axis about which the tongue 24 may pivot horizontally. Coupled between the support structure 22 and the draft tongue 24 is an extensible and retractable hydraulic cylinder 28, with the latter being shown in a fully retracted position wherein it positions the tongue 24 in a leftmost working position. It is to be noted that basic aspects of the present invention require only that the tongue 24 somehow be swung about the axis of the pin 26. For example, in lieu of the cylinder 28, any well-known remotely releasable coupling could be established between the tongue 24 and beam 14, which when released permits the tongue 24 to pivot about the pin 26 by driving the towing tractor in an appropriate direction to effect swinging of the tongue in a desired direction.

A crop harvesting platform 30 includes a platform frame 32 including opposite side walls 34 joined by a rear frame structure 36. The frame 32 is suspended from the carrier frame 12 by a three-bar linkage including a lower pair of links 38 and an upper link 40. The lower pair of links 38 are respectively located at opposite sides of the platform 30 and have rear ends respectively pivotally coupled to the pair of wheel support arms 18, and have front ends respectively pivotally coupled to lower rear locations of the platform frame structure 36. A pair of counterbalance springs 42 have upper ends respectively coupled to upper front locations of the pair of legs 16 and have lower ends respectively coupled to lower rear locations of the platform frame member 36.

Thus, it will be appreciated that the platform 30 may be moved between a lowered working position and a raised transport position through operation of the hydraulic cylinders 20 for adjusting the wheels 21 relative to the frame 12.

The platform 30 includes a forward, generally horizontal top wall which extends between the opposite side walls 34. The top wall includes a relatively narrow, fixed rear rectangular section 44 and a front rectangular section including a minor, fixed left-hand portion 48, and a major right-hand portion forming an access door 50 that is mounted to a forward edge of the rear section 44 by a horizontal hinge assembly 52 that allows the door 50 to pivot vertically. Fixed to a forward edge of the access door 50 is a flexible shield 54 that hangs vertically in front of a rotary cutter bar (the cutter bar has been omitted from FIG. 2 for the sake of simplicity) when the platform 30 is not in use. A flexible shield 56 is likewise mounted to a forward edge of the top wall left-hand minor portion 48. Thus, it will be appreciated that when it is desired to gain access to the rotary cutter bar located within the enclosure defined by the top wall portion 50 and the flexible shield 54, this may be done by pivoting the access door 50, together with the flexible shield 54, upwardly about the hinge assembly 52 from its operative position, shown in FIG. 1, to its open position, shown in FIG. 2.

The present invention comes into play when the access door 50 is swung into its open position. Specifically, fixed to a lower right-hand surface location of a rear region of the tongue 24 is a triangular door engaging plate 60. The door engaging plate 60 may be of any effective shape and is here shown as having a shape of a right triangle, with the hypotenuse being fixed along the tongue 24, with the sides forming the right angle being located behind an upper left-hand corner of the access door 50, and with an edge 62 of the plate 60 extending forwardly from the right angle and making an angle of about 30° with the tongue 24. The edge 62 is engaged by, and supports the open access door 50 in a disposition where it is inclined gradually to the rear from the hinge assembly 48. The edge 62 is so disposed relative to the access door 50, that as the tongue 24 is swung toward the door, the door 50 is pivoted forwardly and closed before it is contacted by the tongue 24. Therefore, if an operator should inadvertently leave the access door 50 in its open position and then resume an operation where it is desired to reposition the mower-conditioner 10 relative to the towing tractor by swinging the tongue 24 toward the open access door 50, such an operation can be done without damaging the door 50 by engaging it with the tongue 24 since the door 50 will close before such an engagement occurs. While it is convenient in the disclosed embodiment for the door engaging plate 60 to be used to support the open access door 50, it will be appreciated that the door 50 may be supported in its open position by other structure.

Figure 4:
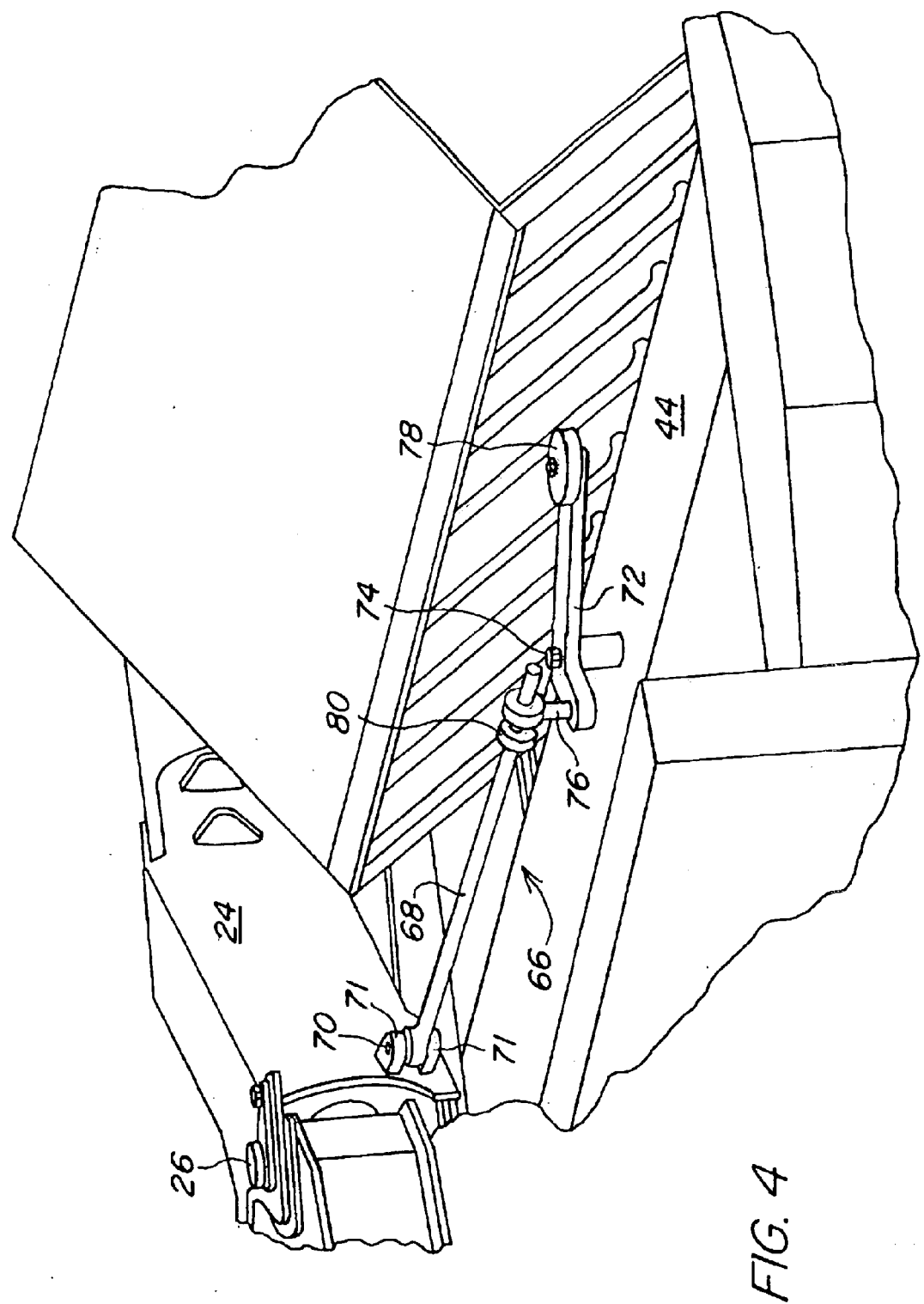
FIG. 4 is a view similar to that of FIG. 3 but showing a linkage connected between the tongue and the access door in accordance with a second embodiment of the invention.

Referring now to FIG. 4 there is shown an alternate embodiment where like structure is indicated by the same reference numerals given above. The only difference in structure is that instead of providing the tongue 24 with a door support plate, a linkage 66 is mounted between the tongue 24 and a central location of the access door 50. Specifically, the linkage 66 includes a link 68 having a left-hand end pivotally mounted, as at an upright pin 70, to a pair of vertically spaced ears 71 fixed to the tongue 24. A bell-crank 72 is mounted to the rear section 44 of the top wall of the of the platform 30 for pivoting about an upright pin 74 located to the rear of a central location of the access door 50. The bell-crank 72 includes a relatively short leg, which carries a swivel-eye 76 in which the link 68 is mounted for free sliding movement, the short leg being joined to, and making an angle of about 90° with, a relatively long leg which carries a roller 78 at its free end. As considered when the tongue 24 is in its left-most position and with the access door 50 open, as shown in FIG. 4, the short leg of the bell-crank 78 ends generally perpendicular to the door 50 while the long leg of the bell-crank extends generally parallel to the access door 50 with the roller 78 engaging the open access door 50. An abutment 80, which may be defined by a washer secured to the rod 68, is positioned for engaging the swivel-eye 76 so as to cause the bell-crank 72 to pivot resulting in the roller 78 being swung forwardly a distance sufficient for closing the door 50 when the tongue 24 is swung toward the door. The length of the rod 68 which extends beyond the swivel-eye from the tongue ensures that the rod will remain within the swivel-eye 76 during operation with the door 50 in its closed operating position. The relative lengths of the short and long legs of bell-crank 72 ensures that sufficient motion will be imparted to access door 50 by the pivoting bell-crank 72 in response to movement of the tongue 24 for closing the access door 50 prior to the tongue reaching the door when swung toward it. For a simpler solution, the link 68 could be pivotally coupled directly to short leg of the bell-crank. This would result in the bell-crank 72 pivoting when the tongue 24 is swung subsequent to the door 50 being closed.

Figure 5:
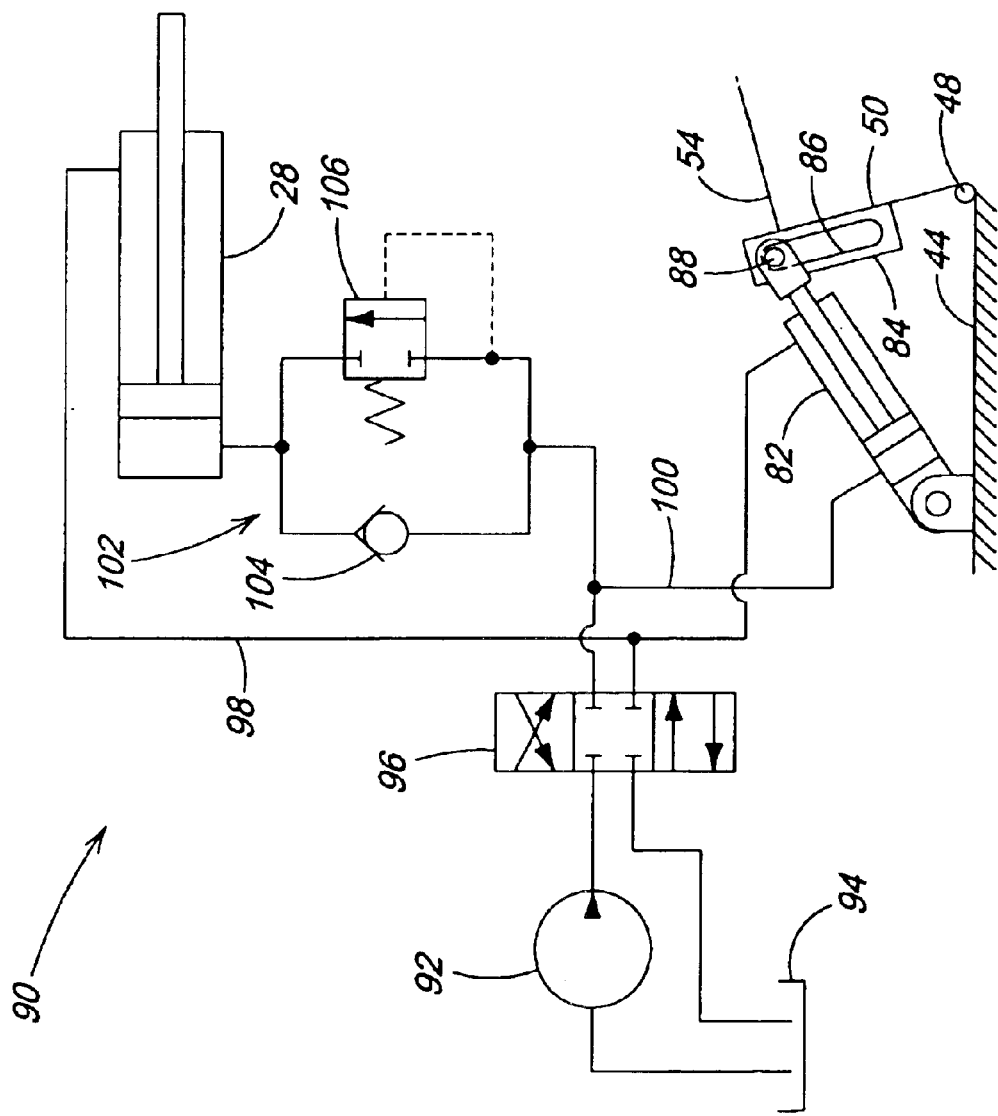
FIG. 5 is a schematic representation of a third embodiment of the invention showing a hydraulic door-operating cylinder coupled to the door and to the hydraulic tongue swing cylinder in a hydraulic circuit.

Referring now to FIG. 5, there is shown a schematic of a third embodiment of the invention. The difference between this embodiment and the second embodiment is that instead of connecting a linkage between the tongue 24 and the access door 50 to ensure that the latter is closed prior to being engaged and possibly damaged by the tongue when the door 50 is inadvertently left open and the tongue is swung toward the door, a hydraulic door closing cylinder 82 is mounted between respective central regions of the top wall section 44 and door 50. The rod end of the cylinder 82 is coupled to the door 50 through the agency of a bracket 84 fixed to the door and containing, as considered when the access door 50 is closed, a fore-and-aft elongated, lost motion slot 86, having a purpose explained below. The rod end of the cylinder 82 is equipped with a clevis that straddles the bracket 84 and is coupled to it by a pin 88 located in the lost motion slot 86, with the pin 88 being located in the remote end of the slot 86 when the door 50 is open, as shown in the drawing.

For effecting operation of the door closing cylinder 82 in response to the tongue swing cylinder 28 being operated to swing the tongue 24 toward the open access door 50, there is provided a hydraulic circuit 90 including a hydraulic pump 92 and sump 94 coupled to a four-way, three-position control valve 96 having a first port coupled by a first branched supply/return conduit 98 to respective rod ends of the tongue cylinder 28 and a door closing cylinder 82. A second branched supply/return conduit 100 couples a second port of the control valve 96 to the head end of the door closing cylinder 82 and to a priority valve 102 including a first path to the head end of the tongue cylinder 28, which is blocked in the direction of the cylinder 28 by a check valve 104, and a second route to the head end of the cylinder 28, which is normally blocked by a pressure-responsive valve 106.

In operation, assuming that the access door 50 has been inadvertently left open and that the operator has resumed operation and desires to reposition the mower-conditioner 10 relative to the towing tractor, the valve 96 will be shifted upwardly from its neutral position shown in FIG. 5. Pressure fluid will immediately be routed to the head end of the door closing cylinder 82 so as to pressurize the head end of the door cylinder 82 while the rod end is coupled to the sump 94. No pressure fluid will at this time be routed to the tongue cylinder 28 since the pressure-responsive valve 106 of the sequencing valve 102 will block flow to the head end of the tongue swing cylinder 28. The door 50 will close upon only a partial extension of the cylinder 82 taking place. When the cylinder 82 has become fully extended, the pressure in the conduit will rise and cause the pressure responsive valve 106 to shift to its open position. The tongue swing cylinder 28 will then extend to swing the tongue to the desired position whereupon the operator will return the control valve 96 to its neutral position. Thereafter, the valve 96 may be shifted to cause other desired movements of the tongue 24 with the door closing cylinder 82 extending or retracting without effecting the position of the closed access door 50 due to the lost motion slot 86. Because the tongue swing cylinder 28 and the door closing cylinder 82 are coupled in parallel, and the resistance to movement offered by the door 50 is much less than the force required to swing the tongue 24, it may be possible to eliminate the sequencing valve 102 since the cylinder 82 would normally extend prior to the cylinder 28 extending.

Having described the preferred embodiment, it will become apparent that various modifications can be made without departing from the scope of the invention as defined in the accompanying claims.

What is claimed is:

1. In a mower-conditioner including a carrier frame extending transversely to the direction of travel of the mower-conditioner and having opposite ends supported on ground wheels, a tongue having a rear region mounted to said carrier frame for pivoting about an upright axis, a cutting platform suspended from said carrier frame and including a rotary cutter bar extending transversely between and fixed to a pair of opposite side walls, said platform including a housing including an access door normally located in a working position wherein it extends generally horizontally above said cutter bar between said opposite side walls, with said access door being mounted for pivoting vertically to an open position wherein said door is in a path of movement of said tongue when the latter is pivoted toward said door, the improvement comprising: said tongue being operatively connected to said door, at least when said door is in said open position, so as to cause said door to be moved to said working position in response to said tongue moving toward said door or to said tongue actuator being controlled for moving said tongue toward said door.

2. The mower-conditioner, as defined in claim 1, wherein said operative connection is established by a door engaging member mounted to said tongue in a location where it engages said door when said door is in said open position.

3. The mower-conditioner, as defined in claim 2, wherein said door engaging member is specially shaped so that it causes said door to be closed prior to being engaged by said tongue when said tongue is moved toward said access door.

4. The mower-conditioner, as defined in claim 1, wherein said operative connection is established by a linkage coupled between said tongue and access door.

5. The mower-conditioner, as defined in claim 4, wherein said linkage includes a one-way connection which transfers motion of said tongue to said door to effect closing of the door only when said tongue is moved toward said door.

6. The mower-conditioner, as defined in claim 1, wherein a tongue actuator in the form of a first hydraulic cylinder is connected between said carrier frame and said tongue; a second hydraulic actuator being coupled to said access door and coupled in a hydraulic circuit with said first hydraulic actuator such that when said first hydraulic cylinder is actuated said second hydraulic actuator will sequence prior to said first hydraulic cylinder so as to cause said door to close prior to swinging movement of said tongue.

* * * * *